United States Patent

[11] 3,555,316

| [72] | Inventor | Donald D. Bleich |
| | | Owosso, Mich. |
| [21] | Appl. No. | 784,694 |
| [22] | Filed | Dec. 18, 1968 |
| [45] | Patented | Jan. 12, 1971 |
| [73] | Assignee | Controls Company of America |
| | | Melrose Park, Ill. |
| | | a corporation of Delaware |

[54] LEAD ATTACHMENT FOR DYNAMOELECTRIC MACHINE AND METHOD OF MAKING SAME
12 Claims, 3 Drawing Figs.

[52] U.S. Cl.................................................... 310/71,
310/260
[51] Int. Cl.................................................... H02k 11/00
[50] Field of Search........................................... 310/71, 43,
51, 260, 214; 339/276(C); 174/87; 264/272

[56] References Cited
UNITED STATES PATENTS

| 2,872,505 | 2/1959 | Ustin............................ | 174/87 |
| 3,093,434 | 6/1963 | Francis......................... | 264/272 |
| 3,293,463 | 12/1966 | Church......................... | 310/71 |
| 3,304,447 | 2/1967 | Lindt............................ | 310/71 |
| 3,304,448 | 2/1967 | Lindt............................ | 310/71 |
| RE24,073 | 10/1955 | Buchanan..................... | 174/74.1 |

*Primary Examiner*—W. E. Ray
*Assistant Examiner*—R. J. Skudy
*Attorneys*—John W. Michael, Gerrit D. Foster, Bayard H. Michael, Paul R. Puerner, Joseph A. Gemignani, Andrew O. Riteris and Spencer B. Michael ABSTRACT: A coil end and lead connection is embedded in an insulating body which is molded directly around the connection. The insulating body is wedged between adjacent coils with the leads extending through the coil channel.

PATENTED JAN 12 1971

3,555,316

Inventor
Donald D. Bleich
By Joseph A. Geniguini
Attorney 3,555,316

LEAD ATTACHMENT FOR DYNAMOELECTRIC MACHINE AND METHOD OF MAKING SAME

BACKGROUND OF INVENTION

1. Field of the Invention

This invention relates to the connection of coil ends to leads in a dynamoelectric machine. In accordance with conventional practice the field coils of an electric motor, or other dynamoelectric machine, are connected to heavier leads. The leads, either directly or through a plug arrangement, establish an electrical connection to an electric source. The coil ends are fragile and must be anchored to reduce the possibility of breakage, and must be anchored in a manner which will provide adequate strain relief. Also the amount of handling of the coil ends should be kept to a minimum to reduce the risk of breakage.

2. Description of the Prior Art

Various coil end and lead arrangements have been proposed in the past and prior efforts to solve the problems of connection and strain relief have led to arrangements which were complex and not entirely satisfactory.

SUMMARY OF INVENTION

A general object of this invention is to provide a relatively simplified connection of coil ends and leads and an arrangement for anchoring that connection in a dynamoelectric machine so as to achieve adequate strain relief; and also a relatively simplified method of making the connection and anchoring it when made.

For the achievement of these and other objects, this invention proposes to embed the connection between a coil end and lead in an insulating body. The body provides structural support and protection for the connection. The body is wedged between adjacent coils to thereby anchor the body and correspondingly the connection between the coil end and lead in a manner which provides adequate strain relief. Preferably, the coil end is connected to the lead and then the connection is placed in mold where an insulating body is molded over the connection and allowed to set whereupon the body is removed from the mold and wedged between adjacent coils in a dynamoelectric machine.

DESCRIPTION OF PREFERRED EMBODIMENT

Figure 1:
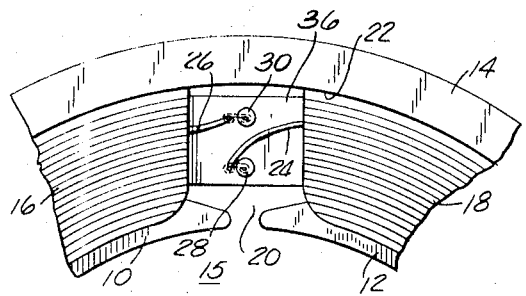
FIG. 1 is a view of a portion of an electric motor structure embodying this invention looking into a coil channel between adjacent coil portions.

This invention can be embodied in a dynamoelectric machine and, in the drawings, is illustrated in connection with a portion of an electric motor stator. The remainder of the stator and the motor are of conventional construction and, since a showing of only the coil arrangement is necessary to an understanding of this invention, the complete motor has not been illustrated.

In accordance with conventional practice, the stator core is laminated and includes a pair of adjacent pole arms 10 and 12 extend radially inwardly from a cylindrical portion 14. The pole arms define an inner opening 15 for receipt of a motor armature (not shown). Portion 14 provides a connecting metallic path between adjacent pole arms and functions in the magnetic circuit of the motor by completing a flux path between adjacent poles. Coils 16 and 18 are wound on pole arms 10 and 12 and have portions extending through coil channel 20. The coil channel is initially defined by radially extending, opposed faces of the pole arms (not shown) and inner wall 22 of portion 14. When the coils are in place a part of the coil channel is occupied with the remaining opening being defined by the opposed, axially extending portions of the coils.

Figure 2:
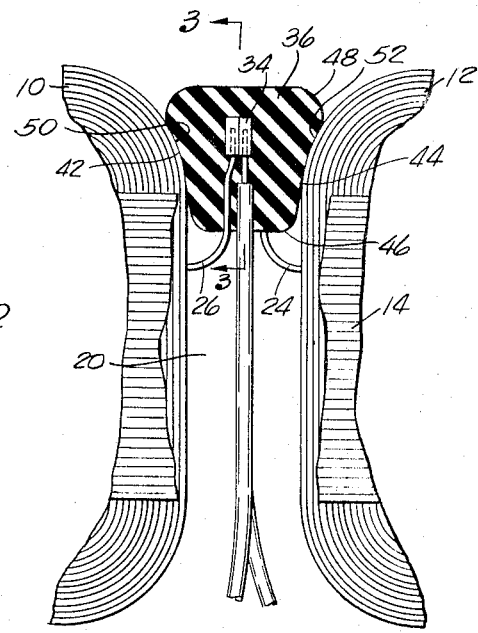
FIG. 2 is a plan view of the structure of FIG. 1 with portions of the stator core broken away to expose the coil channel, the coil ends, leads and the anchoring of the connection between the coil ends and leads.

With reference to FIG. 2, coils 16 and 18 terminate in ends 24 and 26. The coils are generally quite thin and fragile. Generally the coil ends are connected to heavier leads, the leads being used to establish the electrical connection to a source of electricity, either directly or through a suitable plug arrangement. Coil ends 24 and 26 are illustrated as being connected to leads 28 and 30. Generally, it is preferable to anchor the leads or coil ends in such a manner as to provide a strain relief for the coils.

This invention is concerned with the problem of securely connecting the coil ends to the leads and to anchoring that connection in a manner to provide adequate strain relief. Also, the invention contemplates protection of the connection between the coil ends and the leads and minimizes the handling of the coils necessary to make the connection.

Figure 3:
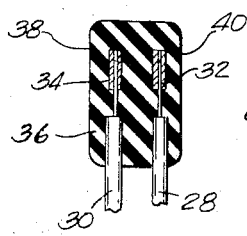
FIG. 3 is a section view generally along line 3—3 in FIG. 2.

More particularly and with reference to FIGS. 2 and 3, coil ends 24 and 26 are connected to leads 28 and 30 respectively by means of electrical connectors 32 and 34. A purely mechanical connection can be established between the coil ends and the leads or the connection can be enhanced by applying solder to the connectors. The coil ends, with the leads connected thereto, are positioned in a suitable mold (not shown) and a suitable material, such as polyvinylchloride, is introduced into the mold around connectors 32 and 34 and the adjacent portions of the coil ends and leads. The polyvinylchoride is allowed to set and thereby form body 36 completely surrounding the connection between the coil ends and leads. Body 36 is then wedged into coil opening 20 between opposed portions 50 and 52 of coils 10 and 12.

Body 36 and the coils are provided with complementary surfaces to permit the wedge connection to be made therebetween. As illustrated in FIGS. 2 and 3, body 36 has a pair of oppositely facing surfaces 38 and 40 and sides 42 and 44. The width of body 36 between surfaces 42 and 44 increases from inner end 46 to an enlarged head 48 at its outer end. Opposed coil portions 50 and 52 similarly have a distance therebetween which increases as it progresses outwardly from the channel opening. The width adjacent inner end 46 of body 36 is preferably less than but generally no greater than the minimum distance between the opposed portions of coils 10 and 12 and surfaces 42 and 44 slope or diverge outwardly from the inner end to enlarged head 48 which has a width substantially greater than the distance between the opposed portions of coils 10 and 12. It will be appreciated that body 36 can have various configurations and as illustrated sides 42 and 44 follow a curvilinear path to better conform to the coils 10 and 12 which thereby provides extensive engagement between body 36 and the coils to enhance the wedging action.

Leads 28 and 30 extend from body 36 into channel 20 and project through the opposite end of the channel where they can proceed through the motor housing (not shown) or to a suitable plug (not shown) in the motor housing. It will be appreciated that by extending the leads through the coil channel as illustrated any tension on the leads will be absorbed in the wedge connection between body 36 and the windings thereby protecting the coil ends from undue strain and, also, tension on the leads tends to enhance the wedge connection of the body in the coil channel.

The connection between the leads and coil ends, and the manner of anchoring that connection, is relatively simple while affording adequate strain relief and desirable protection for the connection between the leads and coil ends. Moreover the assembly technique is relatively simple and the amount of handling of the coil ends is minimized.

I claim:

1. In a dynamoelectric machine
   first and second adjacent electric coils relatively spaced from each other and defining an opening between opposed portions of said first and second electrical coils,
   said first and second electrical coils terminating in ends;
   a lead connected to the end of each of said electrical coils;

means defining a body of electrical insulating material with the connection of said lead and coil ends embedded in said body; and said body wedged in said opening.

2. The dynamoelectric machine of claim 1 including means defining complementary, interengaging wedge surfaces on said opposed coil portions and said body; and wherein said body is wedged between said opposed portions of said electrical coil.

3. The dynamoelectric machine of claim 2 wherein the distance between said wedge surfaces of both said body and said coil portions increases outwardly of said opening.

4. The dynamoelectric machine of claim 1 wherein said leads extend from said body and said connection into said opening; and wherein said means defining said body also defines wedge surfaces engaging said opposed electrical coil portions and having a generally expanding width therebetween in a direction outwardly of said opening.

5. The dynamoelectric machine of claim 1 including means defining a coil channel;

wherein said first and second windings extend through said channel and are relatively spaced to define said opening in said channel, the ends of said coil extending into said opening; and wherein said means defining said body also defines wedge surfaces engaging opposed portions of said coils and progressing from a first distance therebetween within said opening to a distance therebetween outside of said opening which is larger than the distance between the opposed portions of said electrical coils.

6. The dynamoelectric machine of claim 5 wherein said leads extend from said body into said opening so that tension on said leads tends to wedge said body between said opposed electrical coil portions.

7. The dynamoelectric machine of claim 1 including means defining a coil channel;

wherein said first and second coils extend through said channel and are relatively spaced to define said opening as an axial extension through said channel, the ends of said coils extending into said opening;

wherein said body engages opposed portions of said coils and expands from a width in said opening no greater than the distance between said opposed electrical coil portions to an enlarged portion having a width greater than the distance between said opposed coil portions; and wherein said leads extend from said body and connection into said opening away from said enlarged portion so that tension on said leads tends to wedge said body between said opposed coil portions.

8. The dynamoelectric machine of claim 7 wherein said body is made of polyvinylchloride.

9. The method of connecting coil ends of a dynamoelectric machine to leads and of anchoring that connection in the machine, said method comprising the steps of providing first and second adjacent electrical coil in said machine in an arrangement to provide an opening between opposed portions of said first and second coils;

connecting leads to the ends of said coils;

embedding the connections of said leads and coil ends in an electrical insulating body; and wedging said body in said opening to anchor said lead and coil end connections in said dynamoelectric machine.

10. The method of claim 9 including the steps of said lead and coil end connections being positioned in a mold;

said body being molded around said lead and coil end connections in said mold; and wedging said body with said lead and coil connections embedded therein into said opening between said opposed coil portions.

11. The method of claim 10 wherein said leads are drawn through said opening in wedging said body in said opening.

12. The method of claim 9 wherein said body is wedged between said opposed coil portions in said opening.